(12) United States Patent
Sugimori

(10) Patent No.: US 7,034,869 B2
(45) Date of Patent: Apr. 25, 2006

(54) IMAGE PROCESSING METHOD, IMAGE PICKUP APPARATUS AND PROGRAM

(75) Inventor: Masami Sugimori, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 708 days.

(21) Appl. No.: 10/245,750

(22) Filed: Sep. 18, 2002

(65) Prior Publication Data
US 2003/0067548 A1   Apr. 10, 2003

(30) Foreign Application Priority Data
Sep. 20, 2001   (JP) .............................. 2001-287054

(51) Int. Cl.
*H04N 5/228* (2006.01)
*G06K 9/00* (2006.01)

(52) U.S. Cl. .................... 348/222.1; 382/167
(58) Field of Classification Search ................ None
See application file for complete search history.

(56) References Cited

U.S. PATENT DOCUMENTS 5,373,322 A   12/1994 Laroche et al. ............. 348/273
5,629,734 A   5/1997 Hamilton, Jr. et al. ...... 348/222
6,958,772 B1 * 10/2005 Sugimori ................. 348/222.1

FOREIGN PATENT DOCUMENTS

JP   2000253414 A *  9/2000

* cited by examiner

*Primary Examiner*—David Ometz
*Assistant Examiner*—Adam L. Henderson
(74) *Attorney, Agent, or Firm*—Fitzpatrick, Cella, Harper & Scinto

(57) ABSTRACT

To suppress false color satisfactorily and not to suppress colors other than the false color, in a false color suppression process to a color signal generated in a color interpolation process to a color signal obtained by photographing a subject with use of an image pickup unit having a single plate solid-state image pickup element including a color filter of plural colors, a high frequency component of a brightness component is extracted from an attention color signal, hue of the attention color signal is detected, hue of peripheral signals of the attention color signal is detected and a false color suppression process is controlled according to a difference between the hue of the attention color signal and the hue of the peripheral signals and the high frequency component when the detected hue is in predetermined hue areas and the extracted high frequency component is in a high frequency area.

10 Claims, 10 Drawing Sheets

HIGH-PASS FILTER (HPF)

PRIOR ART

FIG. 11

| G11 | R12 | G13 | R14 | G15 |
| B21 | G22 | B23 | G24 | B25 |
| G31 | R32 | G33 | R34 | G35 |
| B41 | G42 | B43 | G44 | B45 |
| G51 | R52 | G53 | R54 | G55 |

▨ = 0

$R33 = (R32+R34)/2$ ⇒ RED
$G33 = 0$
$B33 = (B23+B43)/2 = 0$ $R43 = (R32+R34+R52+R54)/4$ ⇒ RED
$G43 = (G33+G53)/2 = 0$
$B43 = 0$ $R34 = R34$ ⇒ YELLOW
$G34 = (G24+G33+G35+G44)/4$
$B34 = (B22+B25+B43+G44)/4 = 0$ $R44 = (R34+R54)/2$ ⇒ YELLOW
$G44 = G44$
$B44 = (B43+B44)/2 = 0$

PRIOR ART

FIG. 12

| G11 | R12 | G13 | R14 | G15 |
| B21 | G22 | B23 | G24 | B25 |
| G31 | R32 | G33 | R34 | G35 |
| B41 | G42 | B43 | G44 | B45 |
| G51 | R52 | G53 | R54 | G55 |

▨ = 0

$R33 = (R32+R34)/2$ ⇒ CYAN
$G33 = G33$
$B33 = (B23+B43)/2 = 0$ $R43 = (R32+R34+R52+R54)/4 = 0$ ⇒ CYAN
$G43 = (G33+G53)/2$
$B43 = B43$ $R34 = 0$ ⇒ BLUE
$G34 = (G24+G44)/2 = 0$
$B34 = (B23+B25+B43+B45)/4$ $R44 = (R34+R54)/2 = 0$ ⇒ BLUE
$G44 = 0$
$B44 = (B43+B45)/2$

R33=(R32+R34)/2  ⇨ MAGENTA
G33=0
B33=(B23+B43)/2

R43=(R32+R34+R52+R54)/4  ⇨ MAGENTA
G43=(G33+G43+G44+G53)=0
B43=B43

R34=R34  ⇨ MAGENTA
G34=(G24+G33+G35+G44)/4=0
B34=(B23+B25+B43+G44)/4

R44=(R34+R54)  ⇨ MAGENTA
G44=G44
B44=(B43+B44)/2

▨ = 0

R33=(R32-R34)/2=0  ⇨ GREEN
G33=G33
B33=(B23+B43)/2=0

R43=(R32-R34+R52+R54)/4=0  ⇨ GREEN
G43=(G33+G42+G44+G53)/4
B43=0

R34=0  ⇨ GREEN
G34=(G24+G33+G35+G44)/4
B34=(B23+B25+B43+B44)/4=0

R44=(R34+R54)=0  ⇨ GREEN
G44=G44
B44=(B43+B44)/2=0

▨ = 0

IMAGE PROCESSING METHOD, IMAGE PICKUP APPARATUS AND PROGRAM

BACKGROUND OF THE INVENTION

1. Field of the Invention

The present invention relates to a method of suppressing false color.

2. Related Background Art

A conventional digital camera adopting a single plate system has such a structure as shown in FIG. 10. In FIG. 10, light 1 reflected from a subject passes through a photographing lens 2, and then the light quantity is adjusted by an iris 3 to be exposed on a CCD 5 during a time to open a shutter (not shown). With respect to the light 1, a spatial frequency is restricted by an optical low-pass filter 20 so as to reduce moire and false color, and an area on a long wave side is cut by an IR (infrared radiation) filter 4 before the light is exposed on the CCD 5 so that the CCD does not detect light in an infrared area. The light exposed on the CCD 5 is accumulated as electrical charges to be amplified up to a predetermined gain by a CDS/AGC (Correlated Double Sampling/Automatic Gain Controller) 6, and then converted into digital data by an A/D converter 7. The converted digital image data is subjected to RGB gain adjustment by a white balancing unit 8, and, for example, three color planes are generated by a color interpolation unit 9 as shown in FIG. 2. With respect to the image data of RGB three color planes, adjustment regarding hues of RGB data is performed by a masking processing unit 10, and then a process necessary to display the image data on a display or the like is performed by a gamma converter 11.

If the image data is in a state containing the RGB three planes, there are a large number of data, whereby a compression process such as JPEG (Joint Photographic Experts Group) compression or the like is performed. First, an RGB color space is converted into a YUV color space by an RGB/YUV converter 12, and filtering processes by low-pass filters 14a and 14b are performed to restrict a band for color difference signals U and V. Then, a thinning process to convert a YUV444 format signal into a YUV422 or YUV411 format signal is performed by a thinning unit 15, and the converted signal is finally compressed by a JPEG compression unit 16. Thereafter, the compressed image data is stored in a nonvolatile memory (not shown) or the like in a camera main body.

The conventional digital camera adopting the single plate system rarely has a lens exchangeable system but usually has a lens built-in system. Therefore, an optical low-pass filter, an IR cut filter and the like are previously implanted in front of a CCD to reduce the moire and the false color. On the other hand, with respect to the lens exchangeable system, the IR cut filter can be formed on a glass surface of the CCD as a thin film, but if a space for disposing the low-pass filter is prepared, the camera body substantially becomes large in size. Although the moire or the false color can be reduced by inserting the optical low-pass filter, a spatial frequency of image data decreases in this case. As a result, a sharpened focus as observed in a silver salt camera is lost, whereby importance of an optical system not having the optical low-pass filter comes to be increased.

Even if the optical low-pass filter is equipped, in case of the camera adopting the single plate system of a CCD, since the numbers of R and B pixels are less than the number of G pixel and thus the space between the adjacent pixels is wide as represented by Bayer arrangement, the false color is generated when color interpolation is performed.

As the conventional color interpolation method, a method of forming the three color planes by using a digital filter or the like has been known. However, the number of taps of the filter is restricted in an aspect of hardware, and resolution ability originally held in image data can not be sufficiently extracted.

If a color interpolation process proposed in U.S. Pat. Nos. 5,373,322 and 5,629,734 is performed, it is considered that high-resolution image data can be obtained and an effect to reduce the false color can be attained. However, in the following patterns, the false color is generated.

As shown in FIG. 11, when a vertically striped white line is exposed on lines of G and R components on the CCD with distance of pixel pitch, a vertically striped image of red and yellow is obtained by performing the above color interpolation process. Here, it is assumed that an oblique-line portion indicates black and the data thereof is 0. Similarly, as shown in FIG. 12, when the vertically striped white lines are exposed on G and B lines on the CCD with the distance of pixel pitch, a vertically striped image of blue and cyan is obtained by performing the above color interpolation process. In FIGS. 11 and 12, in case of a horizontally striped line in stead of the vertically striped line, the same result is obtained on the horizontally striped line, not the vertically striped line, whereby horizontally striped images of red and yellow and horizontally striped images of blue and cyan are obtained.

Moreover, as different patterns, when a white image like a checker-flag pattern shown in FIG. 13 is exposed on the R and B lines on the CCD, a complete magenta image is obtained by performing the above color interpolation process.

Similarly, as shown in FIG. 14, when the white image like the checker flag pattern is exposed on the G line on the CCD, a complete green image is obtained in spite of the exposed white image by performing the above color interpolation process.

In order to eliminate the false color, it has been proposed that the color space is converted, for example, from an RGB format into an L*a*b* format and a filtering process is performed respectively to a* and b* components by using the application software on a personal computer.

However, in case of the checker flag patterns as shown in FIGS. 13 and 14, the images can not be distinguished from low frequency images of green or magenta, and the obtained result can not be discriminated as the false color, whereby satisfactory suppression can not be performed.

SUMMARY OF THE INVENTION

The present invention has been made in consideration of the above problems, and an object thereof is to satisfactorily suppress false color and not to suppress colors other than the false color.

To achieve the above object, an image processing method of the present invention, which performs a false color suppression process to a color signal generated in a color interpolation process to a color signal obtained by photographing a subject with use of an image pickup unit having a single plate solid-state image pickup element of including a color filter of plural colors, comprises a step of extracting a high frequency component of a brightness component from an attention color signal, a step of detecting hue of the attention color signal, a step of detecting hue of peripheral signals of the attention color signal, and a step of controlling a false color suppression process in accordance with a difference between the hue of the attention color signal and the hue of the peripheral signals and the high frequency component when the detected hue is in a predetermined hue area and the extracted high frequency component is in a high frequency area.

An image pickup apparatus of the present invention comprises a single plate solid-state image pickup element including a color filter of plural colors, means for converting an output from the solid-state image pickup element into a digital signal, means for color interpolating the digital converted signal and forming plural color planes, conversion means for converting a color space of the plural color planes into a color space of a color system represented by brightness and color difference, hue detection means for detecting hue of an attention pixel, means for extracting a high frequency component of a brightness signal of the attention pixel, means for calculating hue of peripheral of the attention pixel and false color suppression processing means for correcting a color difference signal of the attention pixel by using a gain controlled in accordance with peripheral hue of the attention pixel when the high frequency component of the brightness signal is in a high frequency area and the hue is in a predetermined range.

BRIEF DESCRIPTION OF THE DRAWINGS

FIG. 11 is a conceptional view showing a generation process of the false color;

FIG. 12 is a conceptional view showing a generation process of the false color;

DESCRIPTION OF THE PREFERRED EMBODIMENTS

A process explained in the following can be realized by inserting a processing section in an image processing IC held in a digital camera as hardware. As another case, the process also can be realized by performing an application software program on a computer.

First Embodiment

Figure 1:
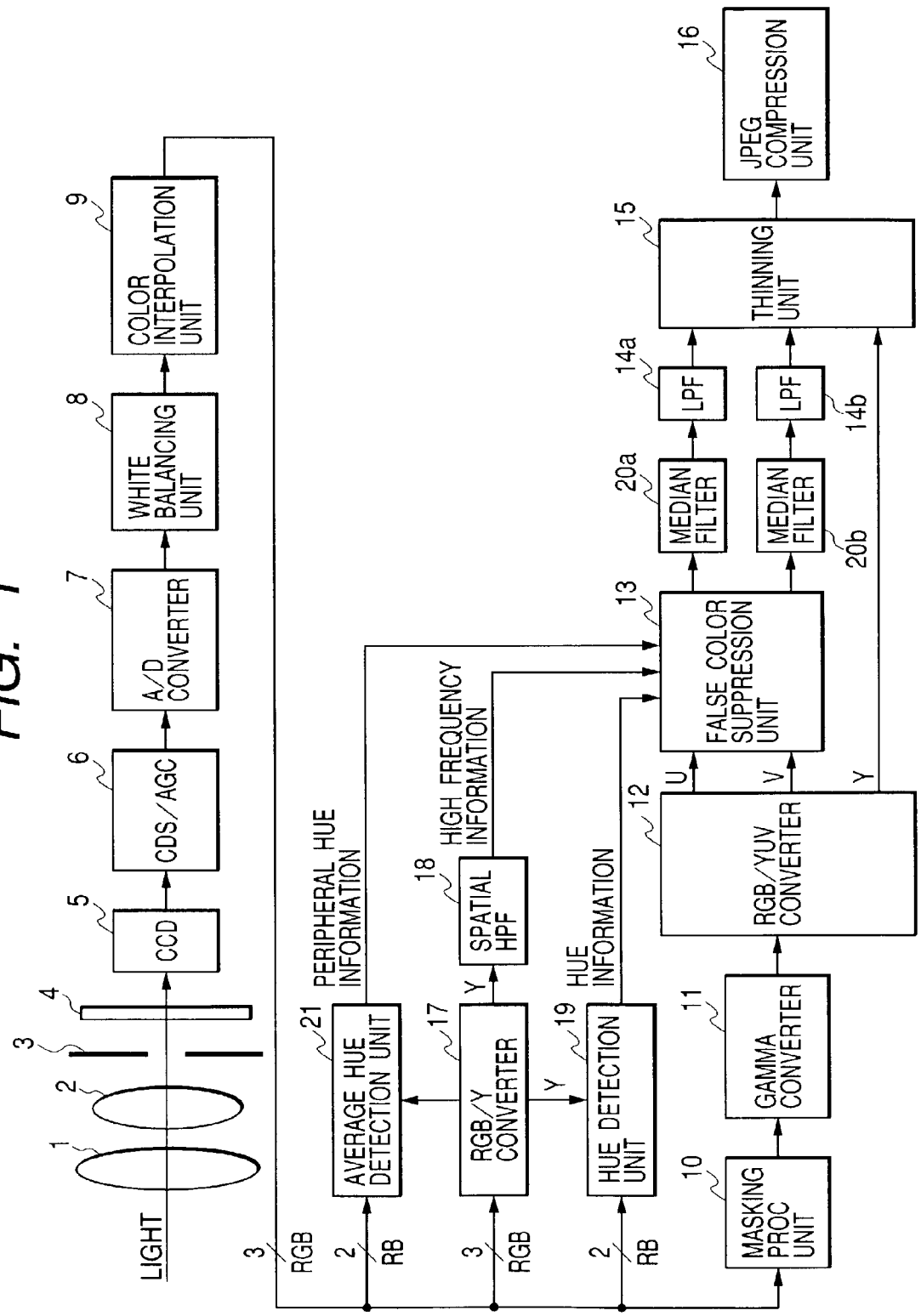
FIG. 1 is a block diagram showing the structure of the first embodiment.

FIG. 1 shows a block diagram for entirely indicating the embodiment of the present invention.

Figure 2:
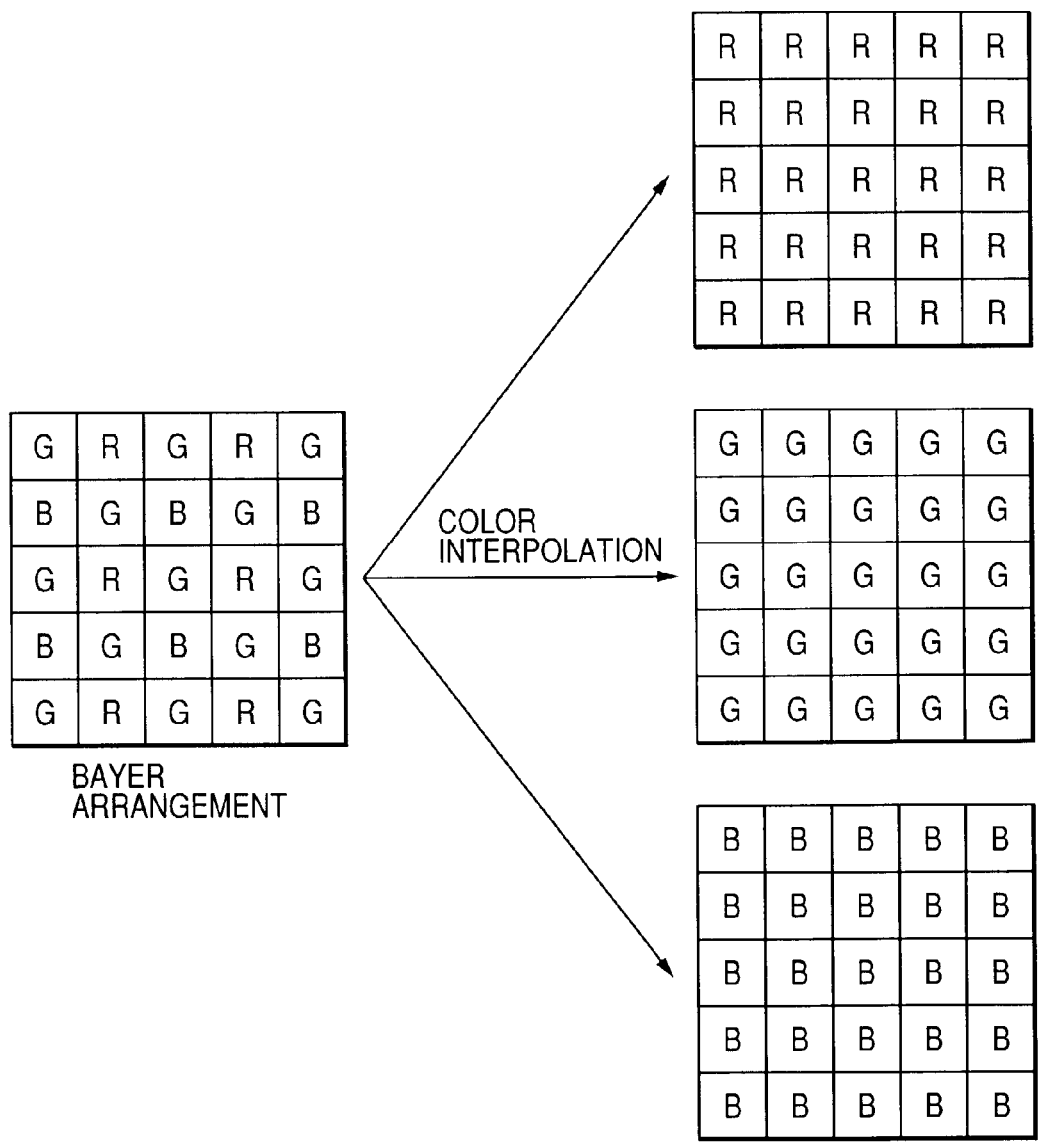
FIG. 2 is a conceptional view showing color interpolation.

In FIG. 1, incident light 1 entered a camera passes through a photographing lens 2 (simply called a lens hereinafter), and then the light quantity is adjusted by an iris 3 to be exposed on a CCD 5 during a time to open a shutter (not shown). With respect to the light 1, an area on a long wave side is cut by an IR filter 4 before the light is exposed on the CCD 5 so that the CCD does not detect light in an infrared area. The light exposed on the CCD 5 is accumulated as electrical charges and amplified up to a predetermined gain by a CDS/AGC 6, and the obtained data is then converted into digital data by an A/D converter 7. With respect to the converted digital image data, adjustment for a gain of RGB data is performed by a white balancing unit 8 to generate, for example, three color planes by using a color interpolation unit 9 as shown in FIG. 2. With respect to image data of RGB three planes, adjustment regarding hues of RGB data is performed by a masking processing unit 10, and then a process necessary to display the image data on a display or the like is performed by a gamma converter 11.

If the image data is in a state containing the RGB three planes, there are a large number of data, a compression process such as JPEG compression or the like is performed. First, an RGB color space is converted into a YUV color space by an RGB/YUV converter 12, for example, using the following expressions.

$$Y = 0.29900 \times R + 0.58700 \times G + 0.11400 \times B \quad (1)$$

$$U = -0.16874 \times R - 0.33126 \times G + 0.50000 \times B \quad (2)$$

$$V = 0.50000 \times R - 0.41869 \times G - 0.08131 \times B \quad (3)$$

Figure 3:
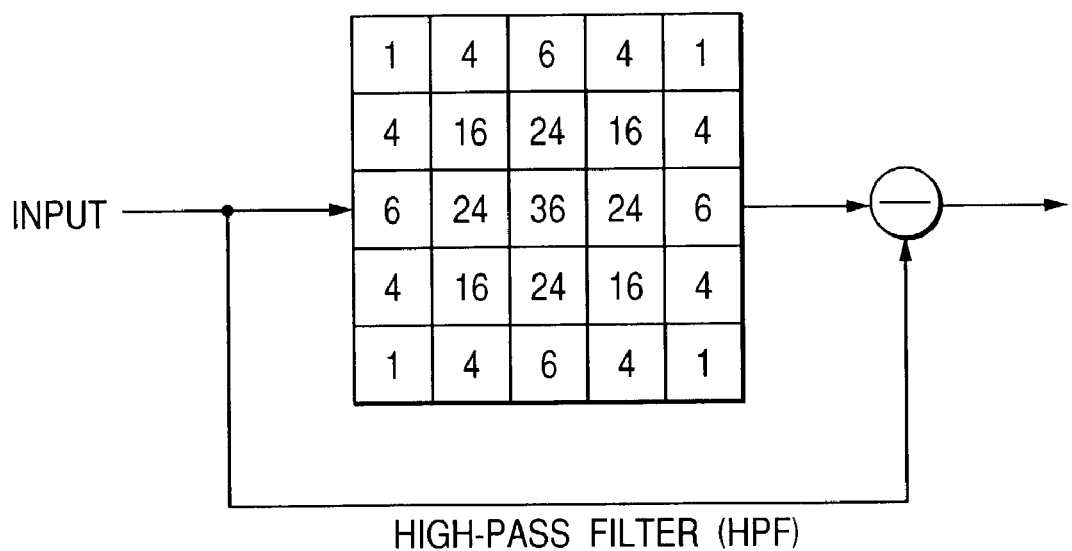
FIG. 3 is a block diagram showing a spatial high-pass filter.

In order to detect a high frequency component and hue, a brightness signal Y is obtained by an RGB/Y converter 17 by using the expression (1) from RGB three plane images obtained by the color interpolation unit 9. In a spatial HPF (high-pass filter) 18, a high frequency component of the brightness signal Y is detected by using spatial high-pass filter calculation as shown in FIG. 3.

In a hue detection unit 19, an R-Y color difference signal and a B-Y color difference signal are calculated based on the brightness signal Y obtained by the RGB/Y converter 17 and the hue is detected from the R-Y signal and the B-Y signal.

Figure 6:
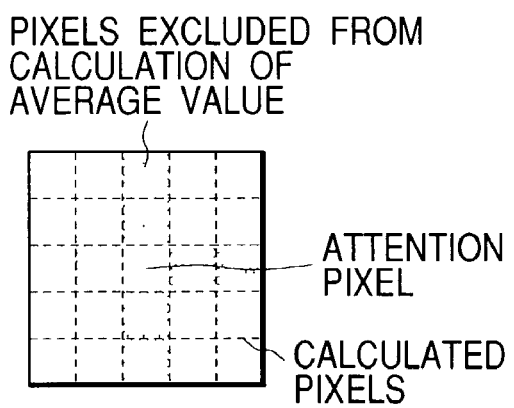
FIG. 6 is a view for explaining an obtaining method of hue information of peripheral pixels.

In an average hue detection unit 21, the hue of peripheral pixels of an attention pixel is detected. As shown in FIG. 6, in the average hue detection unit 21, the hue of the peripheral pixels is detected by using pixels eliminating such pixels, which are horizontally or vertically positioned and are inclined to generate false color similar to a case of the attention pixel, from the peripheral pixels of the attention pixel. In the present embodiment, averages of the respective color difference signals U and V of the peripheral pixels to be calculated are obtained, and the obtained result is treated as peripheral hue information.

In a false color suppression unit 13, the false color is suppressed by approximating values of the input signals U and V to those of the peripheral hue in accordance with the high frequency component of the brightness signal obtained by the spatial HPF 18, the hue information obtained by the hue detection unit 19 and the peripheral hue information.

As one feature of the false color, it is enumerated that false color generated from red and blue corresponds to hue of yellow and cyan. A brightness component of false color generated from each of red and blue is varied. Therefore, in the present embodiment, the false color is suppressed by decreasing gains of the signals U and V for a pixel of which a brightness component is in a high frequency area and color is in yellow and cyan areas. Furthermore, in order to prevent the false color suppression for images of yellow and cyan other than the false color, a suppression line is dynamically obtained.

The detailed description will be given with reference to FIGS. 4 and 5. First, it is judged whether or not the color of the attention pixel is in the yellow and cyan areas (oblique lines area in FIG. 5) in a color space of Y, R-Y and B-Y.

Figure 4:
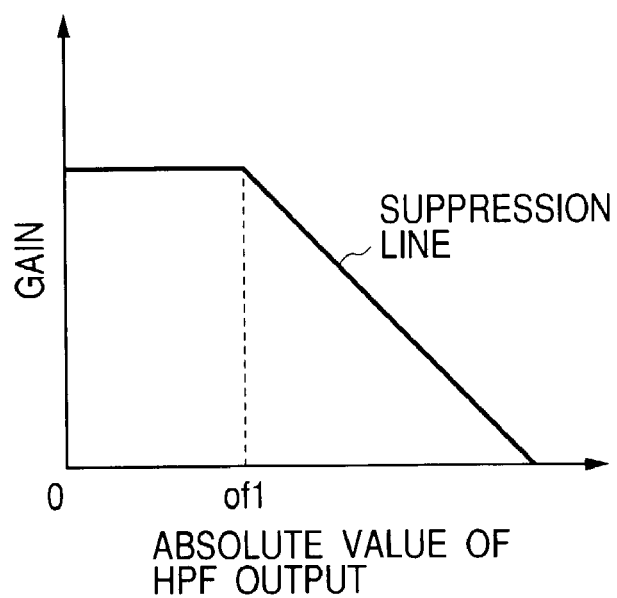
FIG. 4 is a graph for explaining false color suppression.
Figure 5:
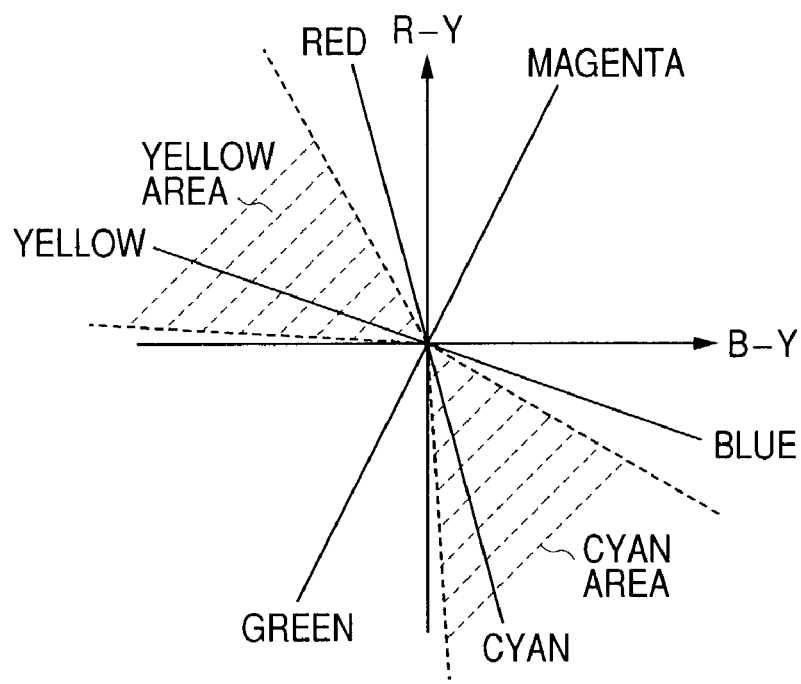
FIG. 5 is a view showing a hue range of false color.

As shown in FIG. 4, when the brightness component is in the high frequency area (an area, where the high frequency component of the brightness component is equal to or larger than a threshold of1) and color of the attention pixel is in the yellow and cyan areas, a gain quantity corresponding to a value of the high frequency component of the brightness signal obtained by the spatial HPF 18 is calculated by using a suppression line of which inclination is obtained on the basis of a difference value between a color difference signal of the attention pixel and a color difference signal being the peripheral hue information. Then, a false color suppression process is performed by performing a correction using a gain quantity obtained for each of the color difference signals U and V of the attention pixel.

As above, in the present embodiment, since the suppression line is obtained on the basis of the difference value of color difference between the attention pixel and the peripheral pixels, if the high frequency component is equal to or larger than the threshold of1, values of the color difference signals U and V of the attention pixel are approximated to those of the peripheral hue, then the false color is suppressed. That is, the color difference signals U and V in the false color are approximated to the peripheral hue.

According to the present embodiment, since suppression quantity is dynamically controlled by using the difference value of the color difference between the attention pixel and the peripheral pixels, that is, since a control is performed on the basis of hue difference between the attention pixel and the peripheral pixels, it can be prevented that the false color suppression process is intensively performed to the high frequency components of a yellow image and a cyan image other than the false color.

The false color existing around a character is isolative, and the false color is not always varied for brightness of the peripheral pixels. Therefore, in the present embodiment, in order to suppress the false color existing around the character, an isolated point elimination process is performed regarding the color difference signals U and V by using median filters 20*a* and 20*b*.

Figure 7:
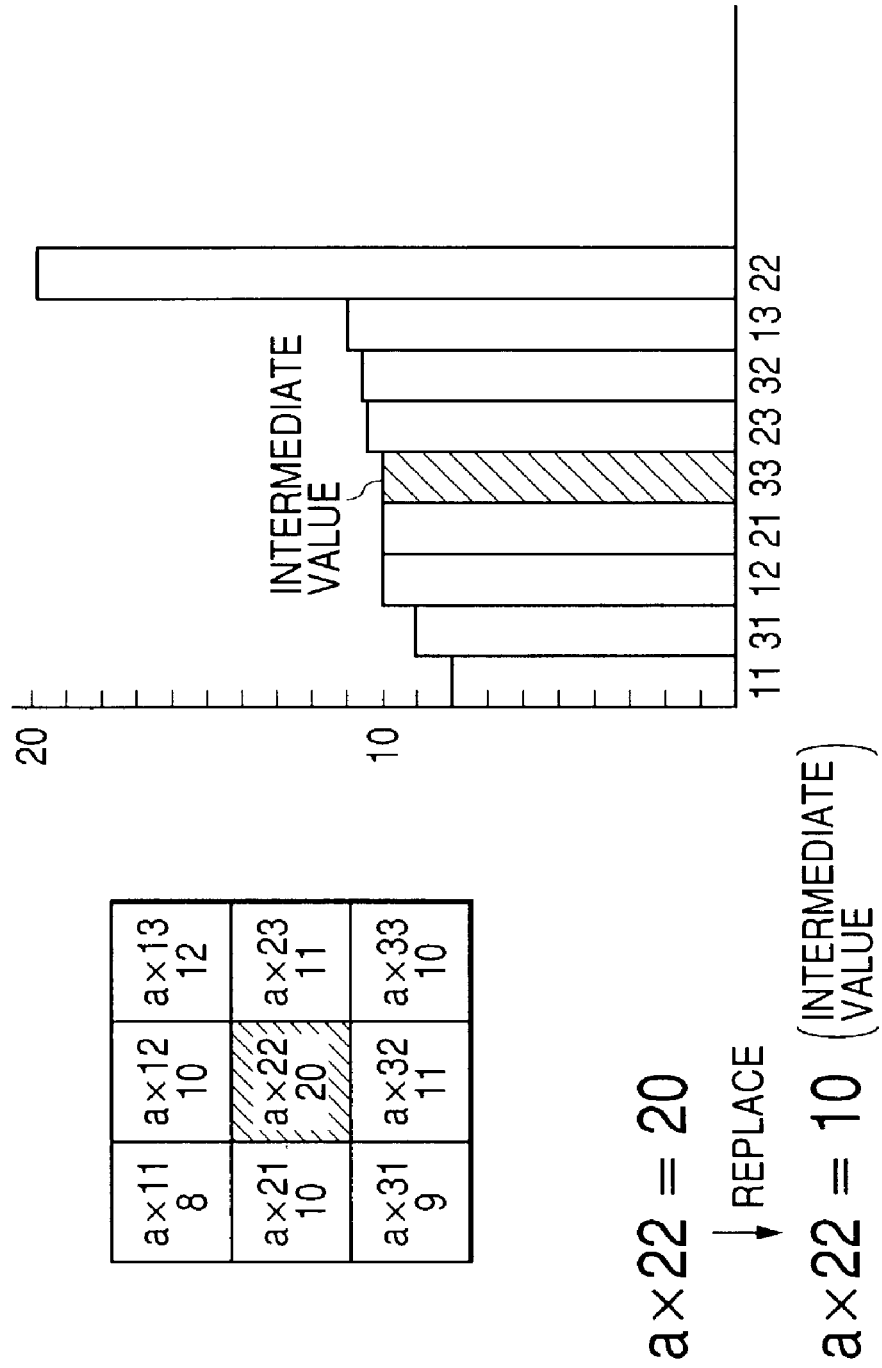
FIG. 7 is a conceptional view indicating an isolated point eliminating method.

FIG. 7 is a view for explaining the above situation. Elements existing within a 3×3 pixels area including the attention pixel are arranged in small value order, and a value of the attention pixel is replaced by an intermediate value of the arranged elements, whereby color extremely different from the peripheral hue disappears. Especially, since a filtering process by a low-pass filter is not applied, resolution ability is not extremely decreased and the peripheral pixels are not influenced.

Then, the filtering process by the low-pass filter is applied in the horizontal or vertical direction by using LPF 14*a* or 14*b,* and a thinning unit 15 performs a thinning process to the color difference signal according to a predetermined JPEG format, e.g., to convert a YUV444 format signal into a YUV422 or YUV411 format signal. Then, JPEG compression is performed by a JPEG compression unit 16.

In the present embodiment, the expression (1) is used for the calculation of the brightness signal Y. However, it is also possible to use another calculation using a simplified brightness signal Ye.

$$Ye = R + 2 \times G + B \quad (4)$$

Furthermore, it is also possible not to calculate the brightness signal and instead use the G signal as the brightness signal.

Second Embodiment

In the above embodiment, the false color has been detected by using a signal formatted to the three planes of RGB data after performing color interpolation by the color interpolation unit 9. This method depends on a fact that, since there is a factor to change a hue such as a masking process, gamma conversion or the like after the color interpolation in the color interpolation unit 9, there is possibility to change a hue range of the false color to be detected. Therefore, the brightness signal Y is calculated by the RGB/Y converter 17 and the color difference signals R-Y and B-Y are obtained by the hue detection unit 19.

However, it is not always required to detect the false color at that time. For example, since it is required to convert the RGB data into data of a color space represented by brightness and color difference in order to perform JPEG compression, the false color can be detected from a signal of that data. However, as mentioned above, there is possibility of changing a hue range of the false color in accordance with kind of images.

When the structure shown in FIG. 1 is adopted with the hardware, a delay occurs between a brightness signal and a color difference signal at a portion of a median filter after performing false color suppression, and the brightness signal has to be delayed.

Figure 8:
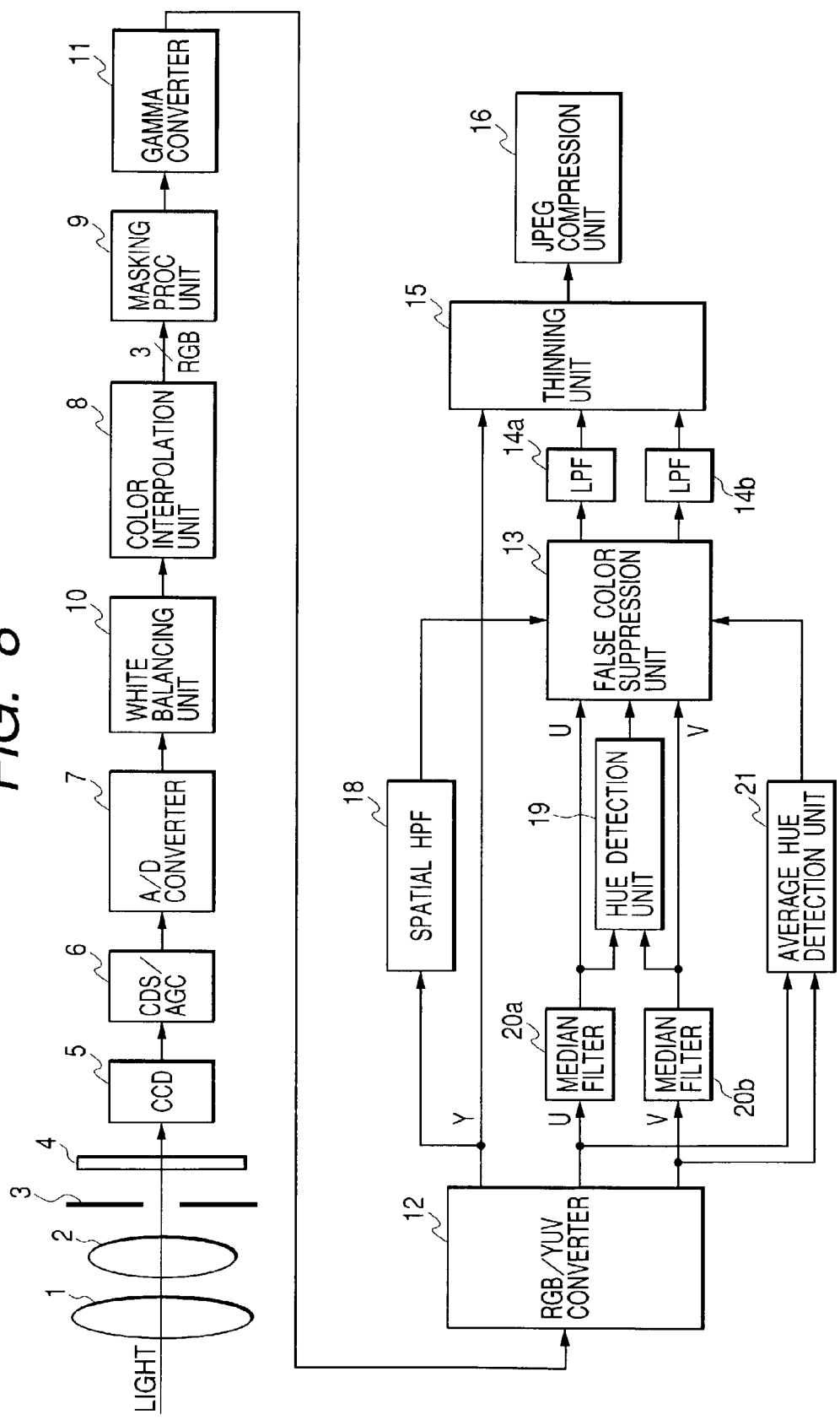
FIG. 8 is a block diagram showing the structure of the second embodiment.

In the present embodiment, an operation to effectively perform a false color processing method using the delay will be explained with reference to FIG. 8. In FIG. 8, it should be noted that the same reference numerals or symbols as those in FIG. 1 are to denote the same components as those in FIG. 1, whereby the explanation thereof will be omitted.

For the brightness signal Y output from an RGB/YUV converter 12, a high frequency component is detected by using a spatial HPF 18. During this detecting period, a filtering process by the median filter is applied to color difference signals U and V output from the RGB/YUV converter 12. According to this process, the filtering process by the median filter is applied to the brightness signal at a time to detect the high frequency component of the brightness signal, and the waste of a memory due to the delay of the other one can be decreased.

Figure 9:
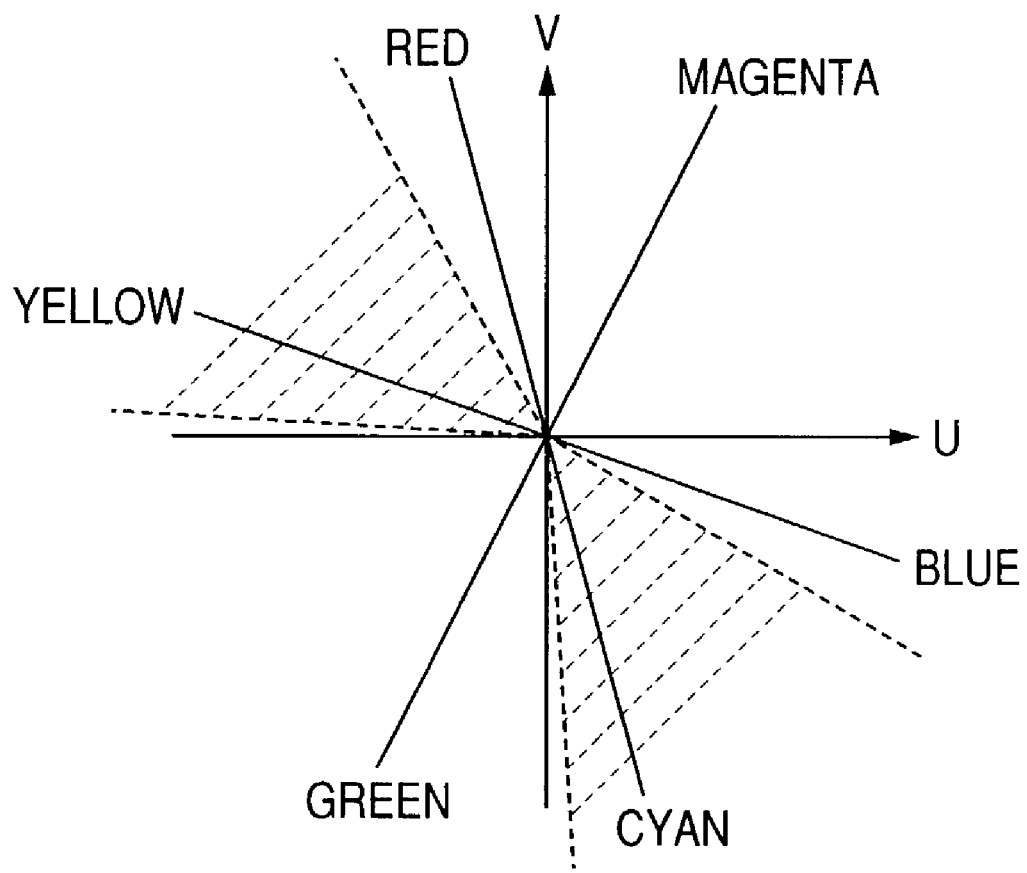
FIG. 9 is a view showing the hue range of the false color.
Figure 10:
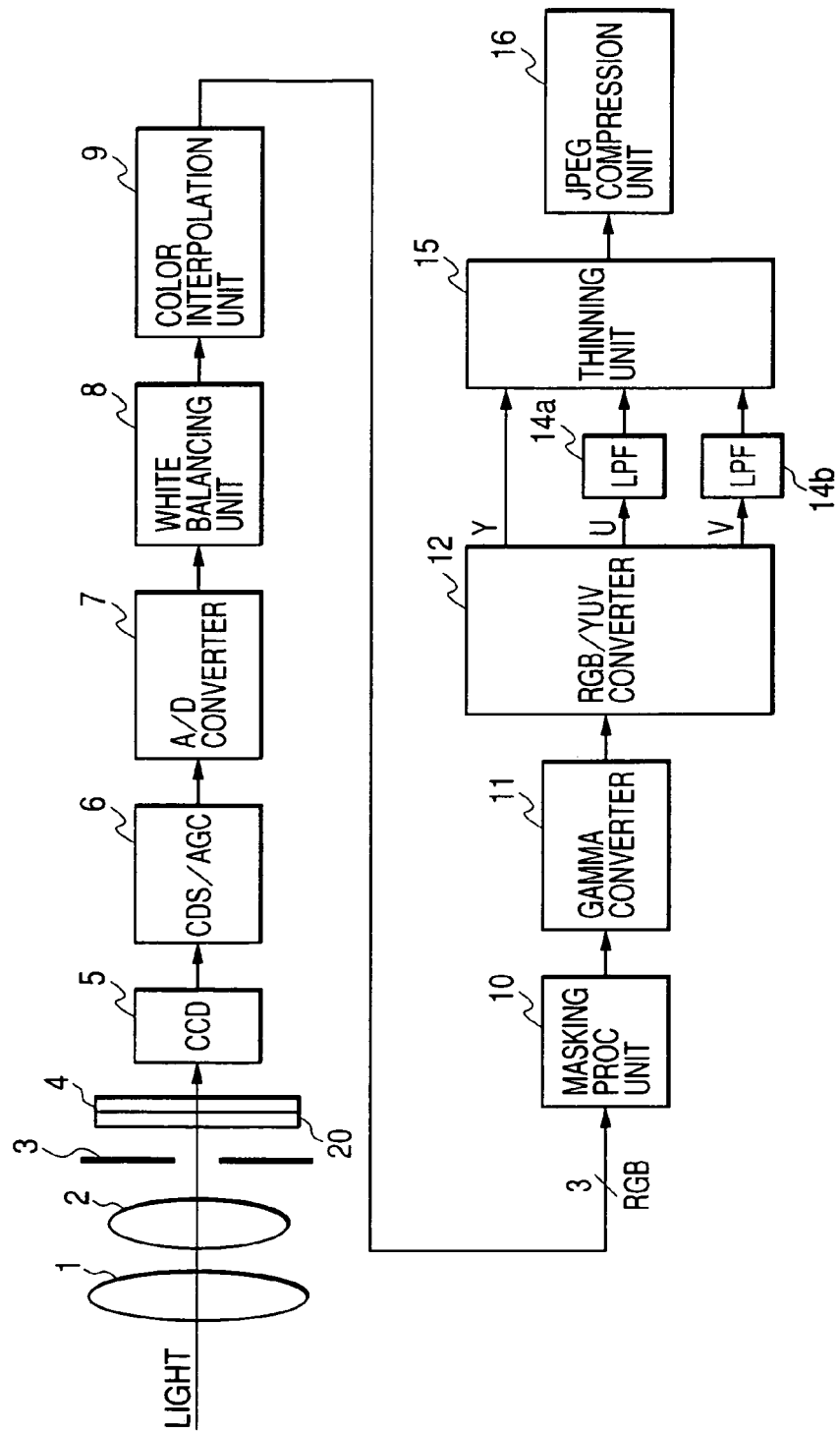
FIG. 10 is a block diagram showing the structure of a conventional example.
Figure 13:
FIG. 13 is a conceptional view showing a generation process of the false color.
Figure 14:
FIG. 14 is a conceptional view showing a generation process of the false color.

Next, in the hue detection unit 19, it is judged whether or not color of an attention pixel is in a hue of the false color from the color difference signals U and V, to which the filtering process by the median filter has been applied. In this case, a color space represented by the U and V is used as shown in FIG. 9 instead of the color space represented by the R-Y and B-Y shown in FIG. 5.

Therefore, similar to the first embodiment, when the color of the attention pixel is in a hue range of the false color and a brightness component is in a high frequency area, values of the color difference signals U and V of the false color are approximated to an average hue of peripheral pixels of the attention pixel in accordance with an output from the spatial HPF 18 in a false color suppression unit 13.

The hue range, to which a process for the false color is performed, may be changed by, e.g., white balance. When a gain of red is increased, it is allowed to approximate the hue range to a red side or increase a hue angle Next, the filtering process by the low-pass filter is applied in the horizontal or vertical direction by using LPF 14*a* or 14*b,* and a thinning unit 15 performs a thinning process to the color difference signal according to a predetermined JPEG format, e.g., to convert a YUV444 format signal into a YUV422 or YUV411 format signal. Then, JPEG compression is performed by a JPEG compression unit 16.

According to the present embodiment, the filtering process by the median filter is applied to the brightness signal at a time to detect the high frequency component of the brightness signal, and the waste of the memory due to the delay of the other one can be decreased.

Other Embodiments

The following case is also included in a category of the present invention. That is, the program codes of software for realizing the functions of the above embodiments are supplied to an apparatus to which various devices are connected or a computer in a system so as to operate the various devices and realize the functions of the above embodiments and then the computer (or CPU or MPU) in the system or the apparatus operates the various devices in accordance with the stored program codes, thereby performing the functions of the embodiments.

In this case, the program codes themselves of the software realize the functions of the above embodiments, and the program codes themselves and means for supplying the program codes to the computer, for example, a storage medium which stored the program codes constitute the present invention.

The storage medium for storing the program codes can be, e.g., a floppy disk, a hard disk, an optical disk, a magnetooptical disk, a CD-ROM, a magnetic tape, a nonvolatile memory card, an ROM or the like.

It is needless to say that the program codes are included in the embodiments of the present invention in a case where the present invention includes not only a case where the functions of the above embodiments are realized by performing the supplied program codes by the computer, but also a case where the program codes cooperate with an OS (operating system) functioning on the computer, another application software or the like and the functions of the above embodiments are realized.

Further, it is needless to say that the present invention includes a case where the supplied program codes are once stored in a memory provided in a function expansion board inserted in the computer or a function expansion unit connected to the computer, and a CPU or the like provided in the function expansion board or the function expansion unit performs all the actual process or a part thereof according to the instructions of the program codes, thereby realizing the functions of the above embodiments.

According to the above constitution, it can be realized that the false color is satisfactorily suppressed and colors other than the false color are not be suppressed.

What is claimed is:

1. An image processing method of performing a false color suppression process to a color signal generated in a color interpolation process to a color signal obtained by photographing a subject with use of an image pickup unit having a single plate solid-state image pickup element including a color filter of plural colors, said method comprising the steps of:
   extracting a high frequency component of a brightness component from an attention color signal;
   detecting hue of the attention color signal;
   detecting hue of peripheral signals of the attention color signal; and
   controlling a false color suppression process in accordance with a difference between the hue of the attention color signal and the hue of the peripheral signals and the high frequency component when the detected hue is in predetermined hue areas and the extracted high frequency component is in a high frequency area.

2. A method according to claim 1, wherein the color filter has three colors of R (red), G (green) and B (blue), and the predetermined hue areas are Y (yellow) and C (cyan) areas.

3. A method according to claim 1, wherein the false color suppression process is performed to obtain a gain quantity on the basis of the extracted high frequency component in accordance with the inclination of a suppression line obtained from difference between the hue of the attention color signal and the hue of the peripheral signals, and a color difference signal of the attention color signal is corrected by using the obtained gain quantity.

4. A method according to claim 1, wherein hue of peripheral color signals is obtained from the peripheral color signals, from which the peripheral color signals of vertical lines and horizontal lines including the attention color signal are excluded.

5. A method according to claim 4, wherein an average value is calculated for each of color difference signals of the peripheral signals.

6. A method according to claim 1, wherein an isolated point elimination process is performed for the color difference signal to which the false color suppression process was performed.

7. A method according to claim 6, wherein the isolated point elimination process is performed by using an intermediate value filter.

8. A method according to claim 1, wherein the predetermined hue areas can be varied by a white balance value.

9. An image pickup apparatus comprising:
   a single plate solid-state image pickup element including a color filter of plural colors;
   means for converting an output form the solid-state image pickup element into a digital signal;
   means for color interpolating the digital converted signal and forming plural color planes;
   conversion means for converting a color space of the plural color planes into a color space of a color system represented by brightness and color difference;
   hue detection means for detecting hue of an attention pixel;
   means for extracting a high frequency component of a brightness signal of the attention pixel;
   means for calculating peripheral hue of the attention pixel; and
   false color suppression processing means for correcting a color difference signal of the attention pixel by using a gain controlled in accordance with the peripheral hue of the attention pixel when the high frequency component of the brightness signal is in a high frequency area and the hue is in a predetermined range.

10. A program for realizing an image processing method of performing a false color suppression process to a color signal generated in a color interpolation process to a color signal obtained by photographing a subject with use of an image pickup unit having a single plate solid-state image pickup element including a color filter of plural colors, said program achieving the steps of:
   extracting a high frequency component of a brightness component from an attention color signal;
   detecting hue of the attention color signal;

detecting hue of peripheral signals of the attention color signal; and controlling a false color suppression process in accordance with a difference between the hue of the attention color signal and the hue of the peripheral signals and the high frequency component when the detected hue is in predetermined hue areas and the extracted high frequency component is in a high frequency area.

* * * * *

UNITED STATES PATENT AND TRADEMARK OFFICE
CERTIFICATE OF CORRECTION

PATENT NO. : 7,034,869 B2
APPLICATION NO. : 10/245750
DATED : April 25, 2006
INVENTOR(S) : Masami Sugimiori It is certified that error appears in the above-identified patent and that said Letters Patent is hereby corrected as shown below:

<u>(56) REFERENCES CITED</u>

Foreign Patent Documents
    "JP 2000253414 A  * 9/2000" should read --JP 2000-253414 A  * 9/2000--.

<u>COLUMN 2</u>

Line 23, "in stead" should read --instead--.

<u>COLUMN 3</u>

Line 64, "entered" should read --entering--.

<u>COLUMN 8</u>

Line 38, "form" should read --from--.

Signed and Sealed this

Twelfth Day of December, 2006

JON W. DUDAS
*Director of the United States Patent and Trademark Office*